July 31, 1934.   V. CHRISTOFFERSEN   1,968,743
PORTABLE IRRIGATION HEADGATE AND DAM
Filed July 26, 1933   2 Sheets-Sheet 1
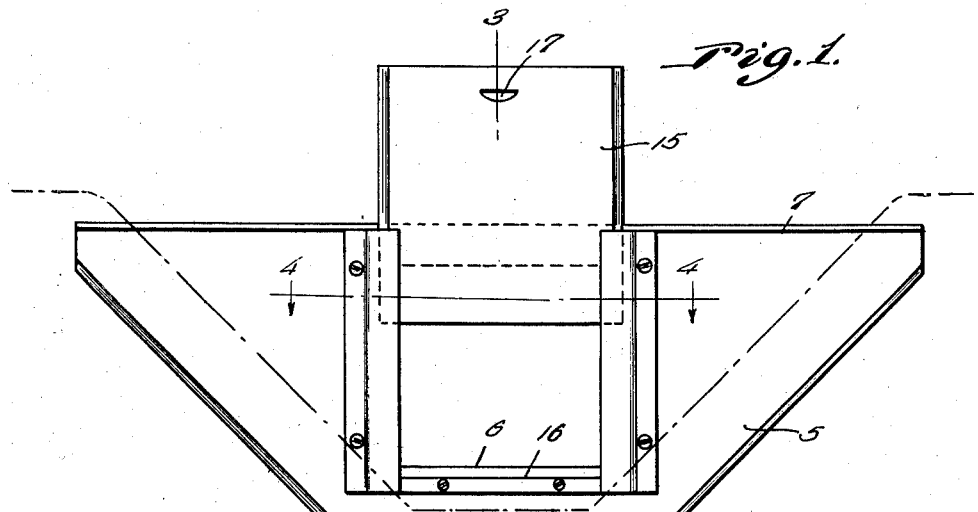
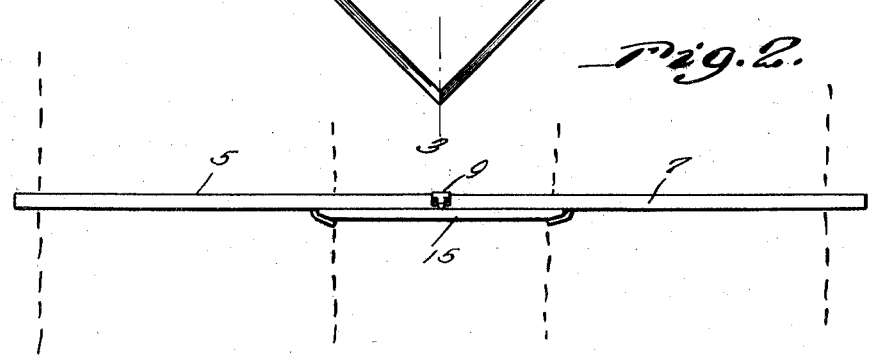
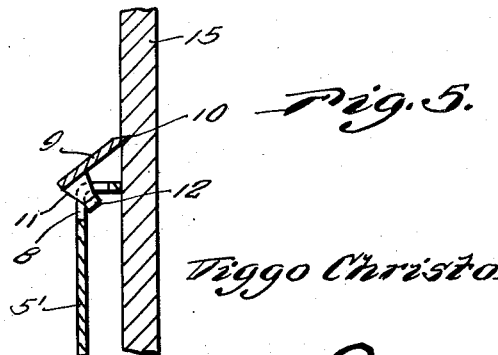
Inventor
Viggo Christoffersen
By Clarence A. O'Brien
Attorney

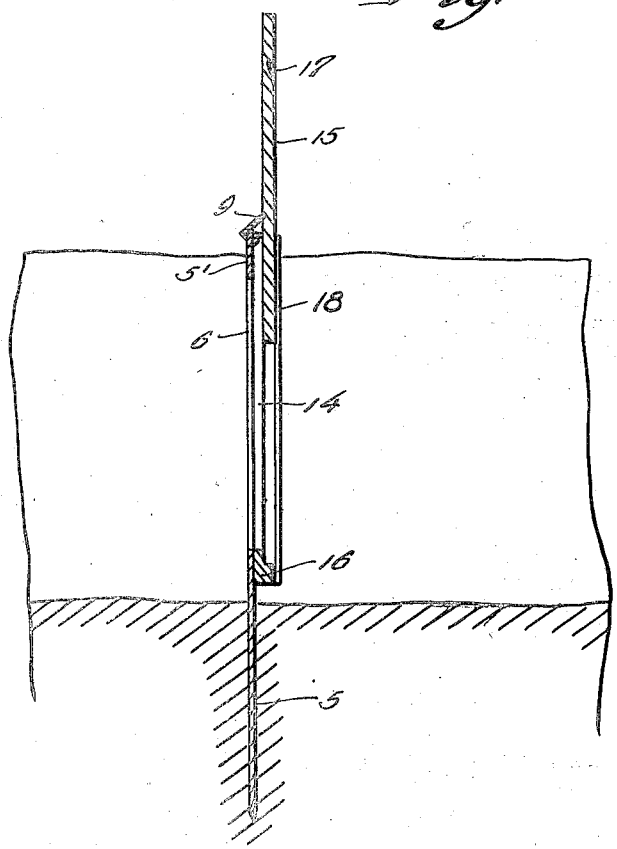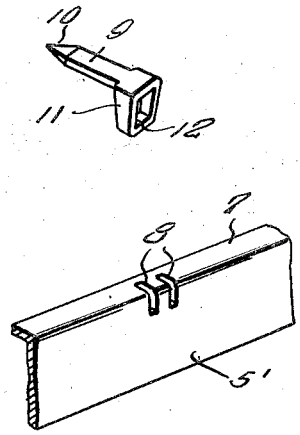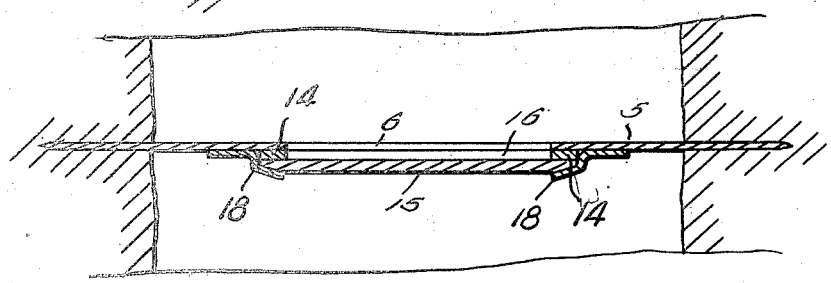

Patented July 31, 1934

1,968,743

UNITED STATES PATENT OFFICE 1,968,743

PORTABLE IRRIGATION HEADGATE AND DAM

Viggo Christoffersen, American Falls, Idaho

Application July 26, 1933, Serial No. 682,336

1 Claim. (Cl. 61—29)

The present invention relates to an irrigation headgate and dam designed particularly for use in irrigating ditches.

An important object of the invention resides in the provision of a novel means adapted to be installed in ditches for controlling the waterflow therein.

Another important object of the invention resides in the provision of a device of this nature capable of being installed and removed expeditiously.

Another very important object of the invention resides in the provision of a device of this nature having an adjustable gate with novel means for holding the gate in different adjusted positions.

A still further very important object of the invention resides in the provision of a device of this nature which is exceedingly simple in its construction, comparatively inexpensive to manufacture, easy to handle, strong and durable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is an elevation of the device embodying the features of my invention.

Figure 2 is a top plan view thereof.

Figure 3 is a vertical section taken substantially on the line 3—3 of Figure 1.

Figure 4 is a horizontal section taken substantially on the line 4—4 of Figure 1.

Figure 5 is an enlarged detail vertical section showing the dog holding the gate in adjusted position.

Figure 6 is a perspective view of the dog, and

Figure 7 is a fragmentary perspective view showing a portion of the cross member with the pair of slots therein.

Referring to the drawings in detail it will be seen that the numeral 5 denotes a substantially triangular shaped body formed preferably of sheet iron, galvanized iron plate or the like. The bottom comes to a point and the sides are cut at an angle which may vary between about eighty to about one hundred degrees, the most practical being cut on an angle of ninety degrees. This body 5 is provided with a rectangular opening 6 adjacent the upper edge thereof and spaced equally from the sides thereof. The upper edge of the body is provided with a right angularly extending flange 7. The cross portion 5' of the body 5 that is the portion above the opening 6 has its juncture with the flange 7 provided with a pair of slots 8. These slots are grouped together approximately above the central portion of the openings 6. As will be seen, the side edges of the body 5 are beveled so that the body can be readily pressed into the dirt and said edges will cut roots, sticks or the like as they pass through the dirt and thus it is not necessary to use a shovel for forming an opening for receiving the device and the device can be readily put in place across a ditch while the water is flowing so that it is not necessary to build a dam across the ditch above the point where the device is to be placed. A dog 9 has a pointed end 10 and lateral extensions 11 at the other end thereof and the terminals of these extensions are bent inwardly as indicated at 12. Before being bent inwardly, of course, the extensions 11 are placed through the slots 8. Thus the dog is permitted a limited rocking movement so as to be placed in engageable or non-engageable position as will be more apparent as the description proceeds.

A pair of vertically arranged strips 14 is fixed to one face of the body 5, one at each side of the opening 6 therein and these strips extend to the flange 7 of the body. These strips have their inner edges flush with the side walls of the opening 6 and a cleat 16 is fastened to the same face of the body and extends from one of the strips 14 to the other and has its upper edge flush with the bottom wall of the opening 6 and this cleat has a groove in its upper outer corner, as shown in Figure 3. Plates 18 of metal or the like of substantially Z-shape in cross section are fastened to the same face of the body 5 and have their intermediate portions abutting the outer edges of the strips 14 and their outer flanges overlapping and spaced from the outer faces of said strips 14, so that these strips 14 and the outer flanges of the plates 18 form guideways for the side edges of the gate 15, the bottom edge of the gate fitting in the groove in the cleat 16 when the gate is in lowered position. As will be seen, the cleats or strips 14 have their outer faces flush with the outer edge of the flange 7 so that the gate, guided in the guideways, will have a portion thereof contact the outer edge of the flange. This arrangement provides a tight fit of the gate with the guideways and the cleat 16, when the gate is lowered, so that there will be practically no leakage past the gate. A hand grip recess 17 is provided in one face of the gate for manipulation thereof.

It will be seen that this gate 15 may be adjusted to any desired open position and the dog swung over so that the pointed end 10 engages the same and holds the gate in this adjusted position. In this way the flow of the water may be controlled.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A portable irrigation head gate and dam comprising a metal body of substantially triangular shape to provide upwardly diverging side edges and a point at the lower end of the body, said side edges being beveled, a horizontal flange at the top edge of the body, said body having a centrally arranged opening therein, the top wall of said opening being spaced below the upper edge of the body, vertically arranged strips fastened to that side of the body from which the flange projects, said strips being located one at each side of the opening and having their outer faces in alignment with the outer edge of the flange, a pair of substantially Z-shaped plates in cross section connected with the body and having their outer flanges overlapping but spaced from the outer faces of the strips to form with said strips guideways, a gate slidably arranged in the guideways, a cross piece at the bottom of the opening and against which the bottom edge of the gate rests when the gate is in closed position, and latch means pivotally connected to the top part of the body and adapted to engage the gate for holding the gate in adjusted position.

VIGGO CHRISTOFFERSEN.